US009626331B2

(12) United States Patent
Franke et al.

(10) Patent No.: US 9,626,331 B2
(45) Date of Patent: Apr. 18, 2017

(54) STORAGE DEVICE CONTROL

(71) Applicant: International Business Machines Corporation, Armonk, NY (US)

(72) Inventors: Hubertus Franke, Yorktown Heights, NY (US); Gokul Bhargava Kandiraju, Yorktown Heights, NY (US); Marcio Augusto Silva, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 14/069,421

(22) Filed: Nov. 1, 2013

(65) Prior Publication Data
US 2015/0127764 A1 May 7, 2015

(51) Int. Cl.
G06F 15/173 (2006.01)
G06F 17/30 (2006.01)

(52) U.S. Cl.
CPC .. *G06F 15/17331* (2013.01); *G06F 17/30138* (2013.01); *G06F 17/30218* (2013.01)

(58) Field of Classification Search
CPC ................................................ G06F 15/17331
See application file for complete search history.

(56) References Cited

U.S. PATENT DOCUMENTS

| 8,301,861 | B2 | 10/2012 | Reiter et al. |
| 8,321,652 | B2 | 11/2012 | Hinz |
| 2011/0022778 | A1 | 1/2011 | Schibilla et al. |
| 2011/0138106 | A1 | 6/2011 | Prabhakaran et al. |
| 2012/0110247 | A1 | 5/2012 | Eleftheriou et al. |
| 2012/0239857 | A1 | 9/2012 | Jibbe et al. |
| 2013/0024644 | A1 | 1/2013 | Givargis et al. |
| 2014/0223028 | A1* | 8/2014 | Peng ....................... H04L 67/10 709/246 |
| 2014/0344513 | A1* | 11/2014 | Lo ............................ G11C 7/04 711/106 |

OTHER PUBLICATIONS

Alan R. Olson et al., "Solid State Drives Data Reliability and Lifetime", Imation White Paper, Apr. 7, 2008.
Yang Hu et al., "Achieving Page-Mapping FTL Performance at Block-Mapping FTL Cost by Hiding Address Translation", IEEE, 2010.

* cited by examiner

*Primary Examiner* — David X Yi
*Assistant Examiner* — Zubair Ahmed
(74) *Attorney, Agent, or Firm* — Derek S. Jennings; Patent Mining Works, LLC

(57) ABSTRACT

A method includes receiving a write request on at least one storage device; detecting a predetermined block of data within the write request; setting a first short code within a translation table if the predetermined block of data is detected; and writing the write request into the at least one storage device if the predetermined block of data is not detected.

16 Claims, 4 Drawing Sheets

STORAGE DEVICE CONTROL

BACKGROUND

The present invention relates to storage device control, and more specifically, to controlling the writing/reading process on solid state disk drives.

SUMMARY

According to one aspect of the present invention, a method includes receiving a write request on at least one storage device; detecting a predetermined block of data within the write request; setting a first short code within a translation table if the predetermined block of data is detected; and writing the write request into the at least one storage device if the predetermined block of data is not detected.

According to another aspect of the present invention a computer system includes: one or more processors, one or more computer-readable memories and one or more computer-readable, tangible storage devices; a write request module operatively coupled to at least one of the one or more storage devices for execution by at least one of the one or more processors via at least one of the one or more memories, configured to receive a write request on at least one storage device; the write request module operatively coupled to at least one of the one or more storage devices for execution by at least one of the one or more processors via at least one of the one or more memories, is further configured to detect a predetermined block of data within the write request; the write request module operatively coupled to at least one of the one or more storage devices for execution by at least one of the one or more processors via at least one of the one or more memories, is still further configured to set a first short code within a translation table if the predetermined block of data is detected; and the write request module operatively coupled to at least one of the one or more storage devices for execution by at least one of the one or more processors via at least one of the one or more memories, is yet further configured to write the write request into the at least one storage device if the predetermined block of data is not detected.

According to yet another aspect of the present invention a computer system includes: one or more processors, one or more computer-readable memories and one or more computer-readable, tangible storage devices; a write request module operatively coupled to at least one of the one or more storage devices for execution by at least one of the one or more processors via at least one of the one or more memories, configured to receive a write request on at least one storage device; the write request module operatively coupled to at least one of the one or more storage devices for execution by at least one of the one or more processors via at least one of the one or more memories, is further configured to detect a predetermined block of data within the write request; the write request module operatively coupled to at least one of the one or more storage devices for execution by at least one of the one or more processors via at least one of the one or more memories, is still further configured to set a first short code within a translation table if the predetermined block of data is detected; and the write request module operatively coupled to at least one of the one or more storage devices for execution by at least one of the one or more processors via at least one of the one or more memories, is yet further configured to write the write request into the at least one storage device if the predetermined block of data is not detected.

DETAILED DESCRIPTION

Figure 1:
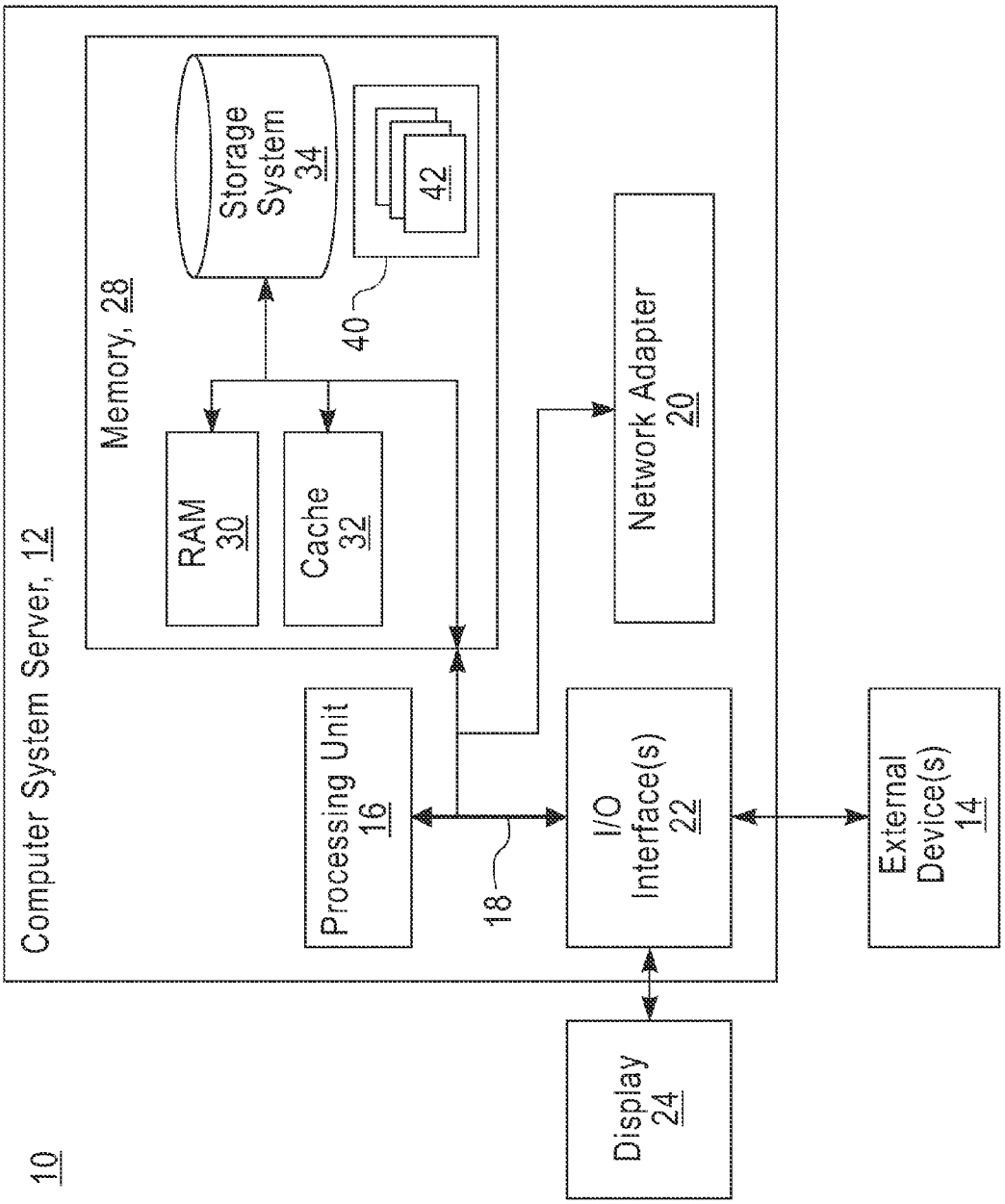
FIG. 1 depicts a cloud computing node according to an embodiment of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. As will be appreciated by one skilled in the art, aspects of the present invention may be embodied as a system, method or computer program product.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media. System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
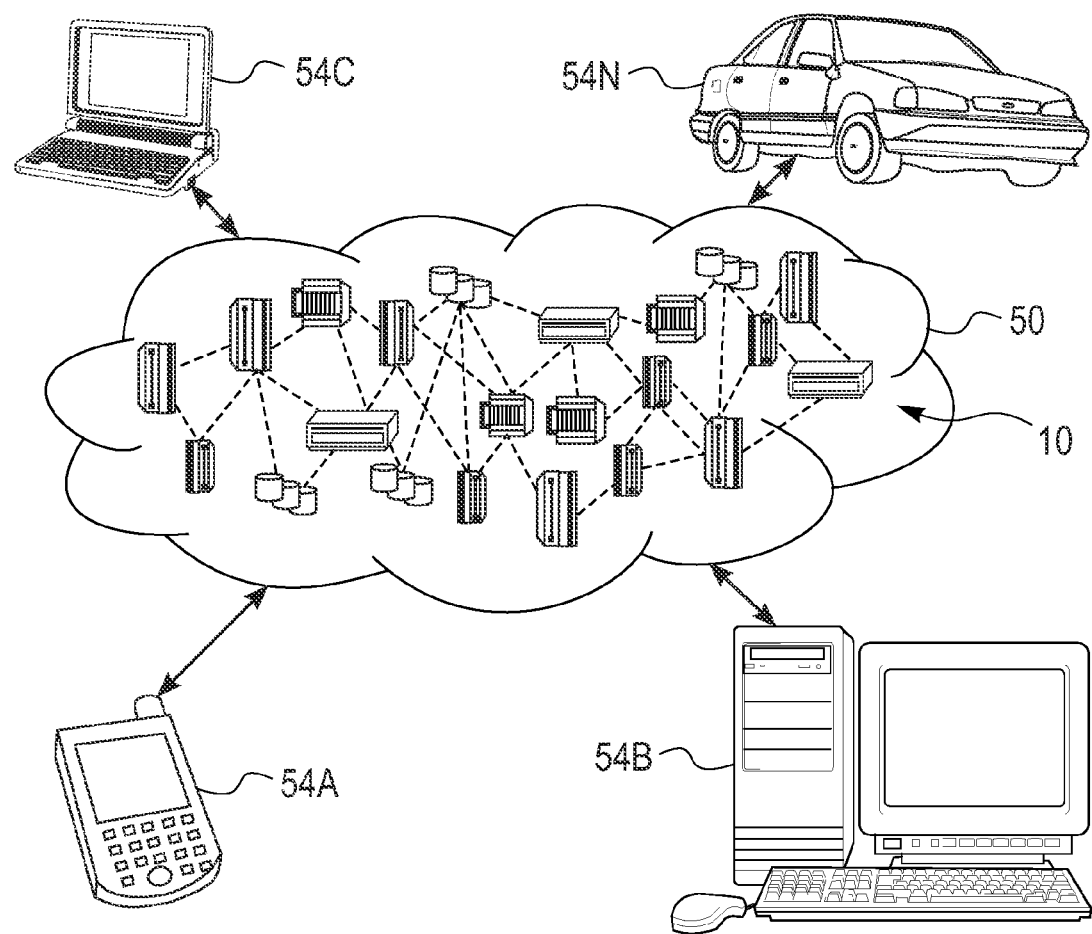
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
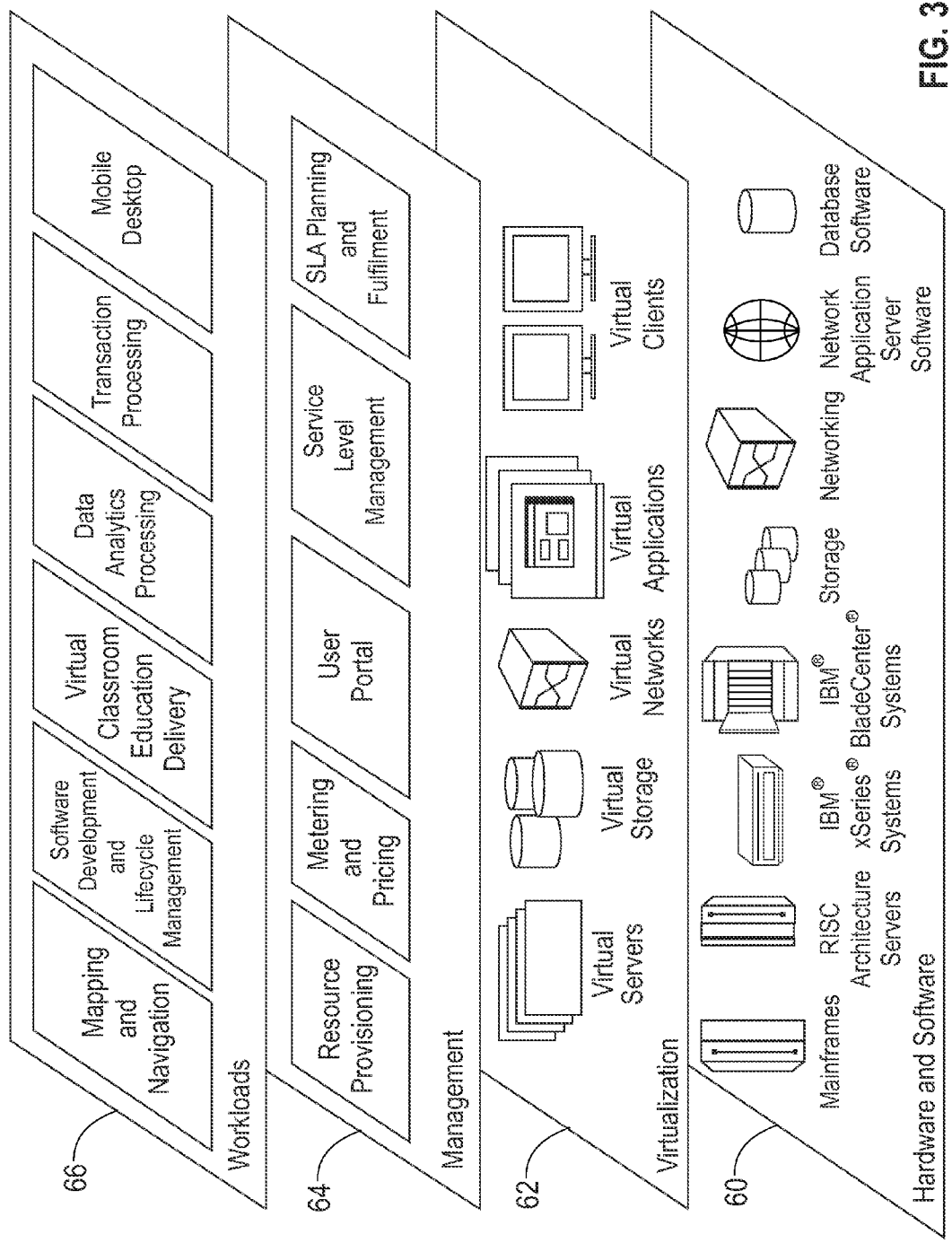
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Figure 4:
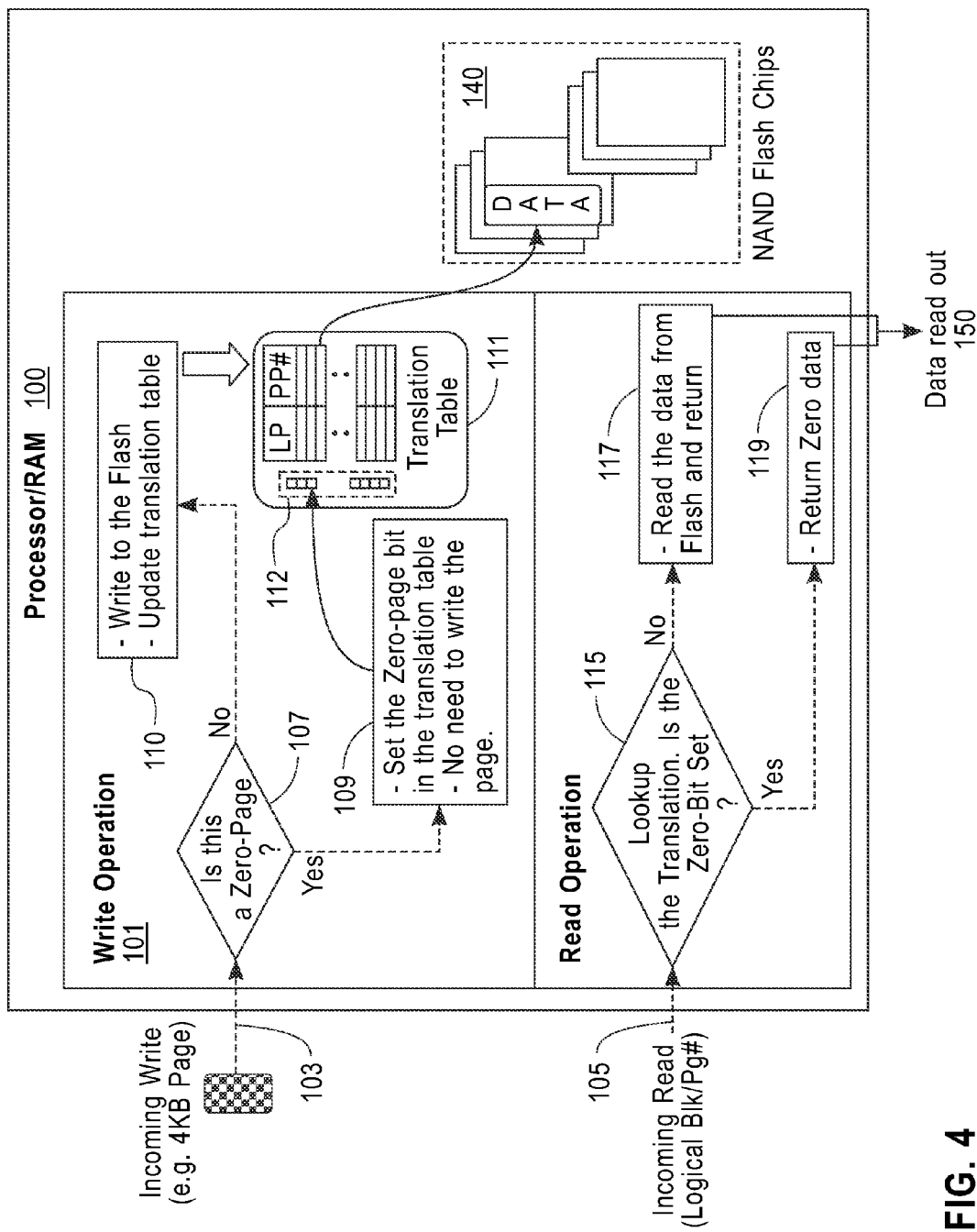
FIG. 4 shows a flowchart and an exemplary implementation according to an embodiment of the present invention.

Referring now to FIG. 4, a flowchart and an exemplary implementation according to an embodiment of the present invention will now be described. Specifically, the flowchart and the exemplary implementation are applicable to either to the hardware/software layer 60 or the virtualization layer 62 of FIG. 3. A solid state disk (SSD) storage device 100 receives write requests 103 and read requests 105 for either writing to or reading data from the NAND flash chips 140. When a write request 103, typically with pages worth of data is received, a write module determines if the page is a Zero page (107). If the page is not a Zero page (110) then a translation table 111 is updated and the page is written to the flash chips 140. If the write request contains a Zero page (109) then write module sets a Zero page bit (112) within the translation table 111. However, no page data is written to the flash chips 140.

Still referring to FIG. 4, when a read request 105 is received, a read module conducts a lookup (115) in translation table 111 to determine if the Zero page bit is set within the translation table 111. If the Zero page bit is set the read module return Zero data (119) as a data read out 150 without reading the flash chips 140. If the Zero page bit is not set then read module reads the data (117) from flash chips 140 and returns the data 150.

The embodiments of the present invention optimizes to increase the lifetime of the SSD, saves space that would have been occupied by not storing zero blocks/pages, and improves the performance of the SSD.

A specific embodiment of the invention applies to writing and reading virtual machine (VM) images on the Solid-state disks. With VM images typically having a number of zero pages data, the invention has the ability to significantly reduce the space, increase the life-time of SSDs and also improve the performance of reading the VM Images, which is very important as hundreds of VM Images are constantly deployed in a cloud setting.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    receiving a write request on at least one solid state storage device for writing to NAND flash memory, the write request comprising blocks from a virtual machine image;
    detecting a predetermined block of data within the write request, wherein the predetermined block of data is a zero page;
    setting a first short code within a translation table within the at least one solid state storage device if said predetermined block of data is detected, wherein the setting said first short code is a zero page bit being set within said translation table; and
    writing the write request into the NAND flash memory of the at least one solid state storage device if said predetermined block of data is not detected.

2. The method according to claim 1, wherein the at least one solid state storage device resides in a computing network.

3. The method according to claim 2, wherein the computing network is a virtual environment.

4. The method according to claim 2, wherein the computing network is a cloud network.

5. The method according to claim 1, wherein the at least one solid state storage device is a solid state disk.

6. The method according to claim 1, further comprising receiving a read request at said at least one solid state storage device and determining if the read request corresponds to the predetermined block of data.

7. The method according to claim 6, further comprising reading the read request from the at least one solid state storage device if said predetermined block of data is not detected.

8. The method according to claim 6, further comprising reading the read request from the translation table if said predetermined block of data is detected.

9. A computer system comprising:
    one or more processors; one or more computer-readable memories and one or more non-transitory computer-readable; tangible storage devices;
    a write request module operatively coupled to at least one of the one or more solid state storage devices for execution by at least one of the one or more processors via at least one of the one or more memories, configured to receive a write request on at least one solid state storage device for writing to NAND flash memory, the write request comprising blocks from a virtual machine image;
    the write request module operatively coupled to at least one of the one or more storage devices for execution by at least one of the one or more processors via at least one of the one or more memories, is further configured to detect a predetermined block of data within the write request, wherein the predetermined block of data is a zero page;
    the write request module operatively coupled to at least one of the one or more storage devices for execution by at least one of the one or more processors via at least one of the one or more memories, is still further configured to set a first short code within a translation table within the at least one solid state storage device if said predetermined block of data is detected, wherein the setting said first short code is a zero page bit being set within said translation table; and
    the write request module operatively coupled to at least one of the one or more solid state storage devices for execution by at least one of the one or more processors via at least one of the one or more memories, is yet further configured to write the write request into the NAND flash memory of the at least one solid state storage device if said predetermined block of data is not detected.

10. The system according to claim 9, wherein the at least one solid state storage device resides in a computing network.

11. The system according to claim 10, wherein the computing network is a virtual environment.

12. The system according to claim 10, wherein the computing network is a cloud network.

13. The system according to claim 9, wherein the at least one solid state storage device is a solid state disk.

14. The system according to claim 9, further comprising a read request module operatively coupled to at least one of the one or more solid state storage devices for execution by at least one of the one or more processors via at least one of the one or more memories, is configured to receive a read request at said at least one solid state storage device and to determine if the read request corresponds to the predetermined block of data.

15. The system according to claim 14, further comprising the read request module operatively coupled to at least one of the one or more solid state storage devices for execution by at least one of the one or more processors via at least one of the one or more memories, is further configured to read the read request from the at least one solid state storage device if said predetermined block of data is not detected.

16. The system according to claim 14, further comprising the read request module operatively coupled to at least one of the one or more solid state storage devices for execution by at least one of the one or more processors via at least one of the one or more memories, is still further configured to read the read request from the translation table if said predetermined block of data is detected.

* * * * *